(12) United States Patent
Baker et al.

(10) Patent No.: US 6,386,352 B1
(45) Date of Patent: May 14, 2002

(54) SWING CONVEYOR ASSEMBLY

(75) Inventors: Adrian Baker, Charleston; William R. Schwelitz, Champaign; Leonard E. Speers, Lerna, all of IL (US)

(73) Assignee: Blaw-Knox Construction Equipment Corporation, Mattoon, IL (US)

( * ) Notice: Subject to any disclaimer, the term of this patent is extended or adjusted under 35 U.S.C. 154(b) by 0 days.

(21) Appl. No.: 09/845,135

(22) Filed: Apr. 30, 2001

(51) Int. Cl.$^7$ ............................................... B65G 65/02
(52) U.S. Cl. ...................................... 198/303; 198/300
(58) Field of Search ................................. 198/300, 303, 198/317, 318, 861.4

(56) References Cited

U.S. PATENT DOCUMENTS

| | | |
|---|---|---|
| 2,374,016 A | 4/1945 | Henneuse |
| 3,103,754 A | 9/1963 | Wieger |
| 3,621,983 A * | 11/1971 | Arentzen et al. ....... 198/303 X |
| 4,074,802 A | 2/1978 | Hudis |
| 4,377,365 A | 3/1983 | Layh |
| 4,382,607 A * | 5/1983 | Voight .................... 198/303 X |
| 4,682,909 A | 7/1987 | Mihara |
| 5,441,361 A | 8/1995 | Campbell |
| 5,680,715 A | 10/1997 | Thiboutot et al. |
| 5,911,300 A * | 6/1999 | Mraz ......................... 198/303 |

* cited by examiner

*Primary Examiner*—James R. Bidwell
(74) *Attorney, Agent, or Firm*—Michael Best & Friedrich LLP

(57) ABSTRACT

A swing conveyor assembly for use with a base vehicle including a first material conveyor having a discharge location. The swing conveyor assembly comprises a platform supported by a wheel assembly, a linkage assembly adapted to be interconnected between the platform and the base vehicle and a second material conveyor. The linkage assembly is configured to permit free vertical movement over a given range of the platform and wheel assembly relative to the base vehicle. The second material conveyor has a receiving location and is rotatably connected to the platform about a vertical rotation axis. The rotation axis extends through the receiving location and the discharge location when the platform is connected to the base vehicle such that receiving location remains aligned with the discharge location as the second material conveyor is rotated relative to the first material conveyor.

20 Claims, 5 Drawing Sheets

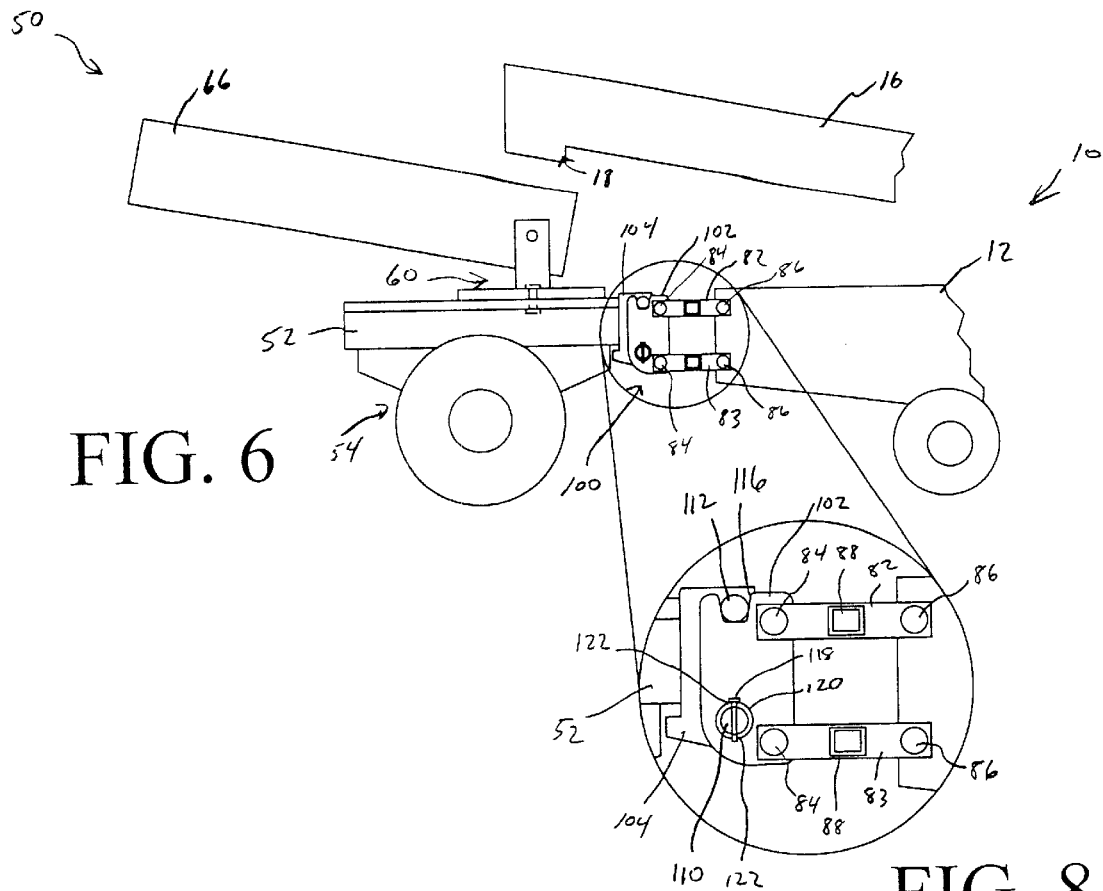
FIG. 6
FIG. 8
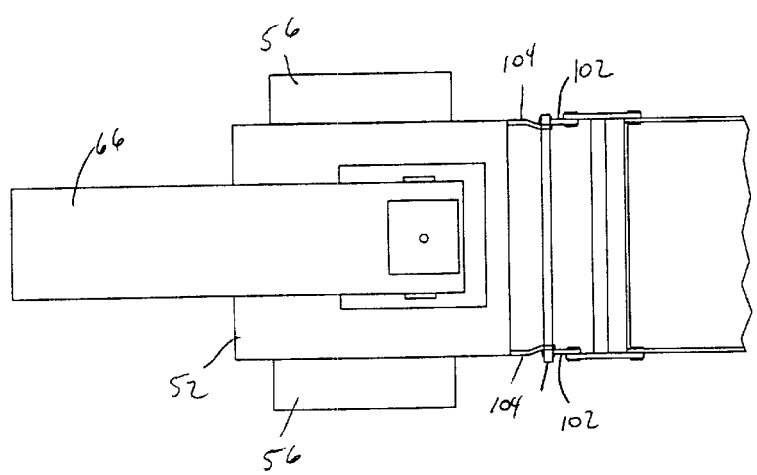
FIG. 7

SWING CONVEYOR ASSEMBLY

BACKGROUND

The present invention relates to paving equipment. More particularly, the present invention relates to a swing conveyor used in the transfer of paving material from the haulage vehicle to the paving vehicle.

In paving large surfaces, for example roadways and parking lots, paving vehicles (also referred to as "pavers"), are typically utilized to lay a smooth mat of material in continuous strips between ten and twenty feet in width. It is preferred that the paver maintain a continuous forward advance during the laying of each individual strip. Any stopping during the process may result in uneven material application or other imperfections in the laid mat.

Pavers generally include a large hopper for holding the paving material, however, in most applications, the hopper is unable to hold sufficient material to lay a complete strip. To avoid stopping of the paver to reload the hopper, various methods have been develop to provide a continuous supply of material to the paver as the paver maintains a forward advance.

One method of supplying the paver is known as the windrow material deposit method. In this method, a truck proceeds in front of the paver and dumps a "windrow" deposit of material in the path of the paver. A windrow elevating machine attached to the front of the paver scoops up the deposited material as the paver advances forward and conveys the material to the paver hopper. While this method has had some success, placing of the material on the ground surface can result in excessive cooling of the material which may adversely affect the paving operation.

Another method of supplying the paver is by directly dumping material from a truck into the hopper. A truck loaded with paving material is positioned in front of the paver with the paver hopper extending under the truck's dump bed. The truck and paver move forward in unison and material is dumped from the truck directly into the hopper as needed to maintain a continuous supply of material in the hopper. However, the height of the truck bed and the lack of a large overhang, generally prevent the truck from completely filling the hopper. Without a full hopper, the paver can operate only operate for a limited time, for example, approximately thirty seconds, without refilling from the truck. Therefore, truck changeover, i.e. the replacing of an empty fill truck with a new, full fill truck, must be accomplished very quickly to allow continuous paver advancement. Such quick changeovers are often difficult, if not impossible, to accomplish.

To increase change over time, material conveying machines have been employed between the material truck and the paver hopper. The material conveying machines have a low collection head which allows easier transfer of material from the truck bed. The material is conveyed from the collection head to a large capacity hopper, often the same capacity as the truck bed. An elevated conveyor transfers the material from the large capacity hopper to the paver hopper. Since the conveyor is elevated, the paver hopper can be completely filled. Additionally, the large capacity hopper allows a continuous supply of material even during a truck change over. An example material conveying machine is the Blaw Knox MC-330 material conveyor.

SUMMARY

In some paving operations, for example, in tight confines, it is difficult to pave with the truck and material conveying machine directly in front of the paver. It is desirable to provide a second conveyor attached to the rear of the material conveying machine which is rotatable approximately 180°, thereby allowing side delivery to the paver hopper. The second conveyor is preferably rotatable about a vertical axis extending through the discharge area of the material conveying machine conveyor such that the conveyors remain aligned and material can be received over the full range of rotation.

It is also preferable that the second conveyor is positioned on a platform pivotally interconnected with the material conveying machine and supported by an independent wheel assembly. As such, the second conveyor is independently supported, i.e., the weight of the second conveyor is not carried by the material conveying machine. Adding additional weight to a previously balanced conveying machine may result in an undesireble weight imbalance for the conveying machine. Additionally, the pivotal interconnection with the conveying machine allows the second conveyor assembly to vertically adjust as it travels over surface irregularities.

BRIEF DESCRIPTION OF THE DRAWINGS

FIG. 6 is a side elevation view illustrating the linkage assembly of a second embodiment of the present invention;

FIG. 7 is a top view illustrating the linkage assembly of FIG. 6;

FIG. 8 is an exploded view of the linkage assembly of FIG. 6;

DETAILED DESCRIPTION OF THE PREFERRED EMBODIMENTS

Figure 1:
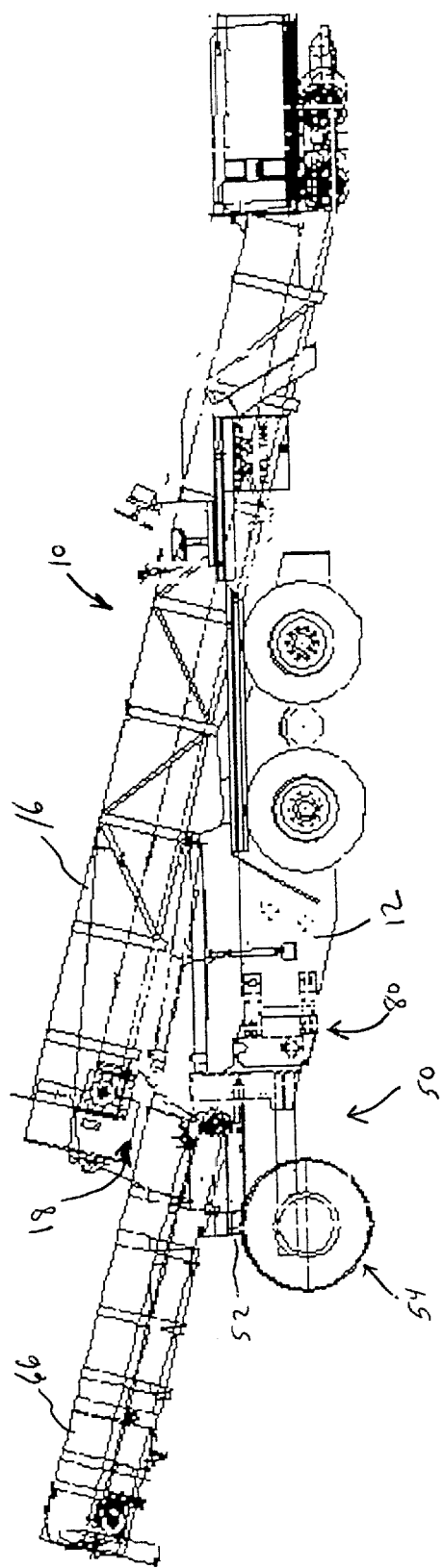
FIG. 1 is a side elevation view illustrating a swing conveyor assembly of the present invention positioned relative to a material conveying machine.

The preferred embodiments of the present invention will be described with reference to the drawing figures wherein like numerals represent like elements throughout. Certain terminology, for example, "front", "frontward", "forward", "back", "rear" and "rearward", is used in the following description for relative descriptive clarity only and is not intended to be limiting.

Referring to FIGS. 1–5, a swing conveyor assembly 50 that is a first embodiment of the present invention is shown. The swing conveyor assembly 50 generally comprises a platform 52, a wheel assembly 54, a second conveyor assembly 60 and a linkage assembly 80. The platform 52 is supported by the wheel assembly 54 which will be described in more detail hereinafter. The platform 52 is preferably pivotally interconnected to the body 12 of the material conveying machine 10 via the linkage assembly 80. The swing conveyor assembly 50 is configured such that the discharge area 18 of the main conveyor 16 is aligned with the second conveyor 66 as will be described in detail hereinafter.

Figure 2:
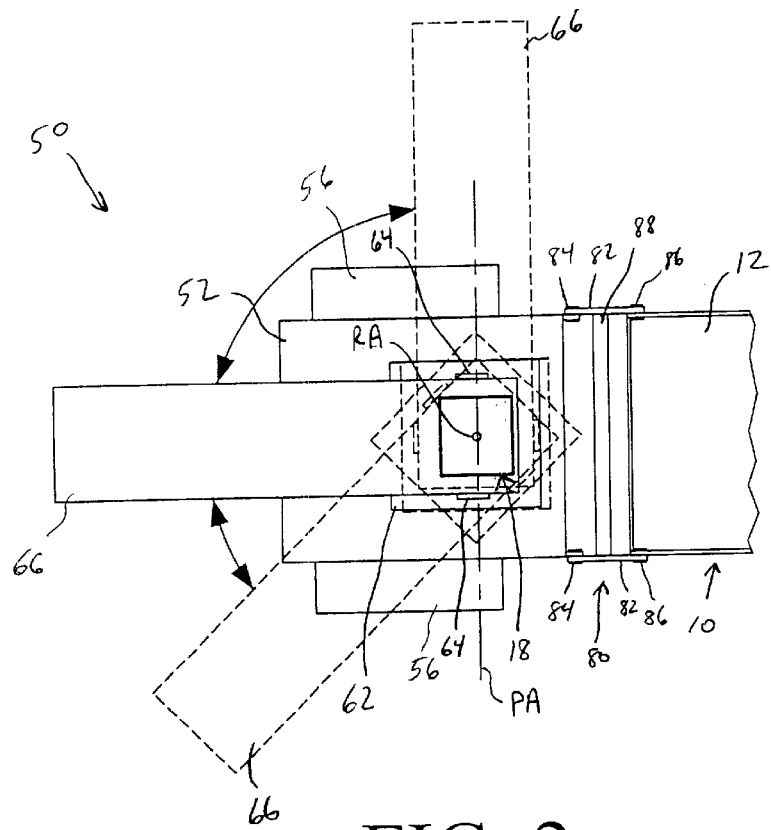
FIG. 2 is a top view of the swing conveyor assembly of the present invention illustrating rotation of the second conveyor, the main conveyor omitted for clarity.
Figure 4:
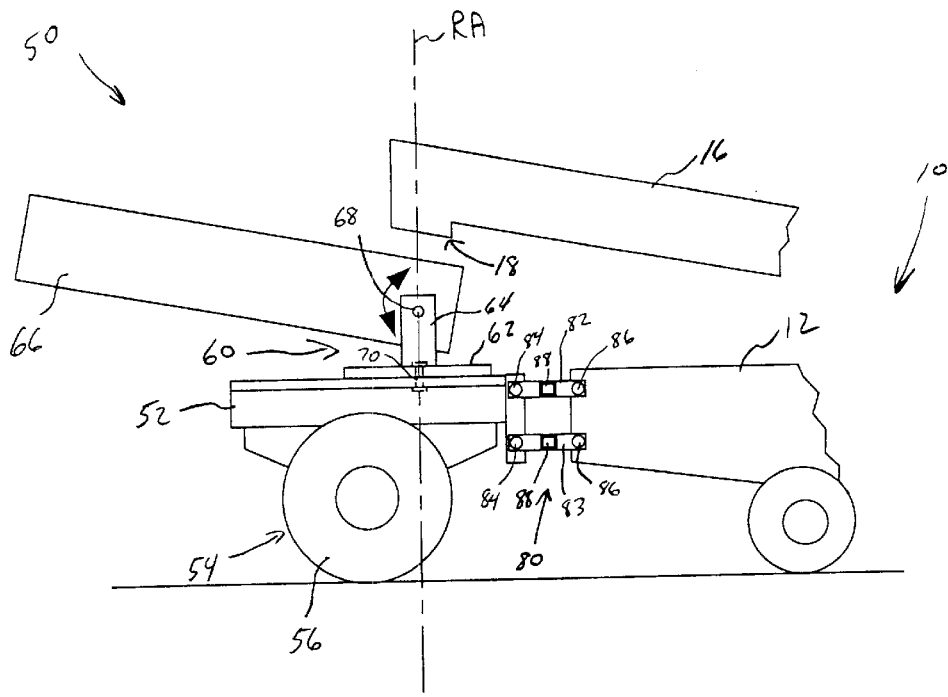
FIGS. 4 and 5 are side elevation views illustrating pivoting of the linkage assembly.

Referring to FIGS. 2 and 4, the preferred second conveyor assembly 60 includes a base plate 62 interconnected to the platform 52 by a pin 70 such that the base plate 62 is rotable about a vertical rotation axis RA. A pair of opposed brackets 64 extend up from the base plate 62. Second conveyor 66 is pivotally connected to the brackets 64 by one or more pins 68 extending along horizontal pivot axis PA. The second conveyor 66 can be any of various configurations, for example, a belt conveyor, a slat conveyor or a bucket conveyor. Pivoting of the second conveyor 66 about the pivot axis PA is preferably controlled by a hydraulic system (not shown), but other means can be utilzed.

Referring to FIG. 2, the base plate 62, and thereby the second conveyor 66, is rotable about the rotation axis RA in both directions. As such, the swing conveyor assembly 50 can be utilized to transfer material to a paver (not shown) on either side of the material conveying machine 10. In the preferred embodiment, the rotation axis RA extends through the second conveyor 66 and the discharge area 18 of the main conveyor 16. As such, the second conveyor 66 is positioned to receive material from the main conveyor 16 as the second conveyor 66 is rotated along its full range of motion. While a conventional pivot joint, for example, one used for towable trailers, between the swing conveyor assembly 50 and the conveying machine 10 can be used to facilitate rotating of the second conveyor 66, such is not preferred because such could result in misalignment between the second conveyor 66 and the discharge area 18 when the second conveyor 66 is rotated. As such, the range of rotation may be limited to prevent misalignment or means could be provided to realign the discharge area 18, for example, by rotating the main conveyor 16.

Figure 3:
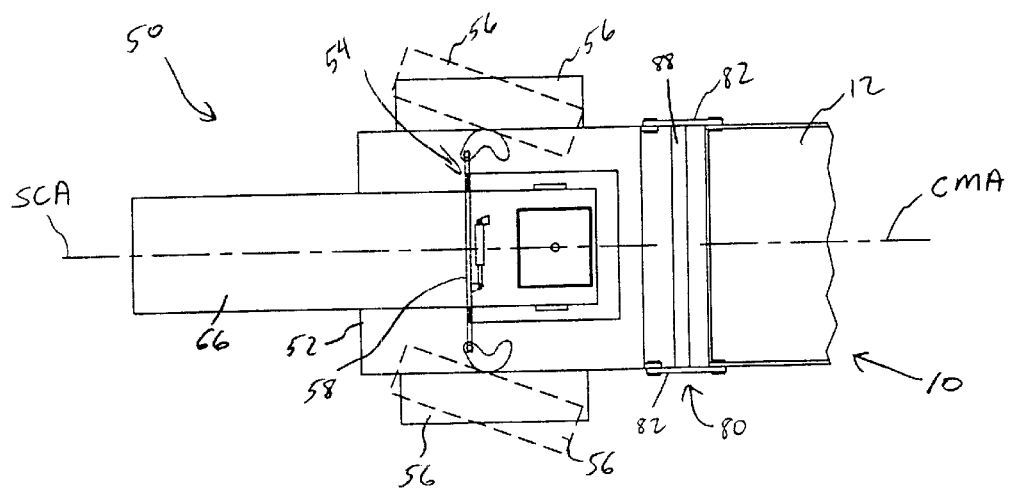
FIG. 3 is a top view illustrating the preferred wheel assembly of the present invention, the main conveyor omitted for clarity.

Referring to FIG. 3, in the preferred embodiment, the longitudinal axis SCA of the swing conveyor platform 50 is maintained in a fixed lateral relationship to the longitudinal axis CMA of the conveying machine body 12. That is, the linkage assembly 80 provides a laterally rigid connection between the swing conveyor assembly 50 and the conveying machine 10 such that the swing conveyor assembly 50 does not move or rotate laterally relative to the conveying machine 10. To facilitate steering in this preferred embodiment of the present invention, the wheel assembly 54 is steerable. The opposed wheels 56 are interconnected by a steering linkage 58 which can be controlled by the vehicle operator. The illustrated steering linkage 58 is hydraulically controlled, but other assemblies may be utilized.

Referring to FIGS. 2–5, the linkage assembly 80 of the first embodiment of the present invention will be described. The linkage assembly 80 includes two link bars 82, 83 on each side of the swing conveyor assembly 50 pivotally interconnected between the platform 52 and the conveying machine body 12 at pivot points 84 and 86. The opposed upper link bars 82 are interconnected be a stabilizing crossbar 88 as are the opposed lower link bars 83. While the linkage assembly 80 is illustrated with two pairs of interconnected link bars 82, 83, fewer or more link bars 82, 83 may be utilized. For example, a single link bar (not shown) may extend between the platform 52 and conveying machine body 12 at a central location.

Figure 5:
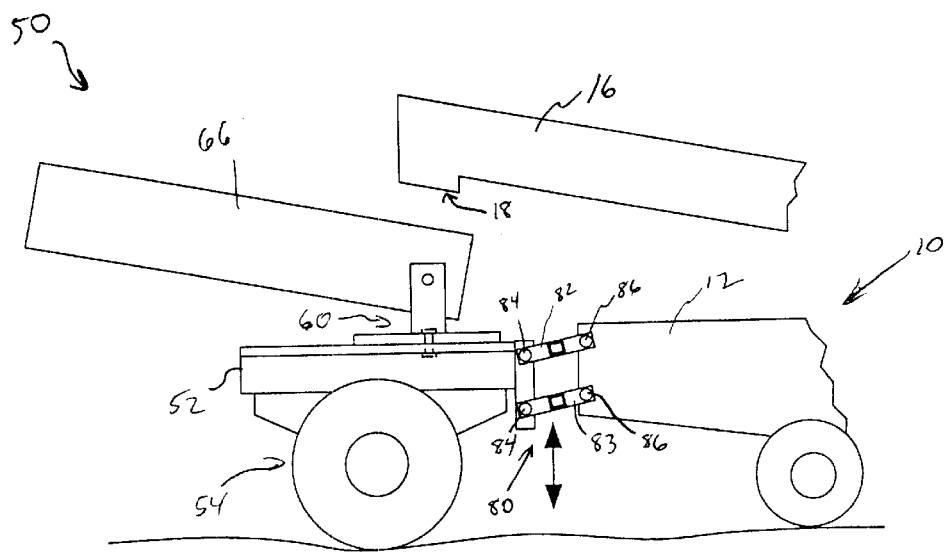

As illustrated in FIGS. 4 and 5, the linkage assembly 80 allows the platform 52, and thereby the wheel assembly 54, to move vertically in response to changing surface parameters, for example, rough road terrain or objects in the path of the swing conveyor assembly 50. In this configuration, the swing conveyor assembly 50 is self-supported. That is, the weight of the swing conveyor assembly 50 is not carried by the material conveying machine 10.

Since the conveying machine 10 is typically manufactured with a balanced configuration absent the swing conveyor assembly 50, rigidly attaching the swing conveyor assembly 50 to the conveying machine 10 and thereby applying the swing conveyor assembly weight thereto, generally creates an unbalanced weight distribution. The unbalanced weight distribution can cause steering and other problems due to the reduced ground pressure at the front of the machine 10.

Referring to FIGS. 6–11, a linkage assembly 100 of a second embodiment of the present invention is illustrated. The linkage assembly 100 is similar to the linkage assembly 80 of the previous embodiment, but includes a means for quickly disconnecting the swing conveyor assembly 50 from the linkage assembly 100. The preferred linkage assembly 100 includes two pairs of link bars 82, 83 interconnected by a support crossbar 88. The link bars 82, 83 are pivotally connected to the conveying machine body 12 at pivot points 86, however, instead of connecting to the platform 52, the link bars 82, 83 are pivotally connected at pivot points 84 to a pair of opposed plates 102. Each plate 102 is releasably coupled to a respective bracket 104 extending from the respective side of the platform 52. The releasable coupling between the plates 102 and brackets 104 allows the swing conveyor assembly 50 to be disconnected from the conveying machine 10 without interfering with the pivot bearings 84 and 86.

Figure 9:
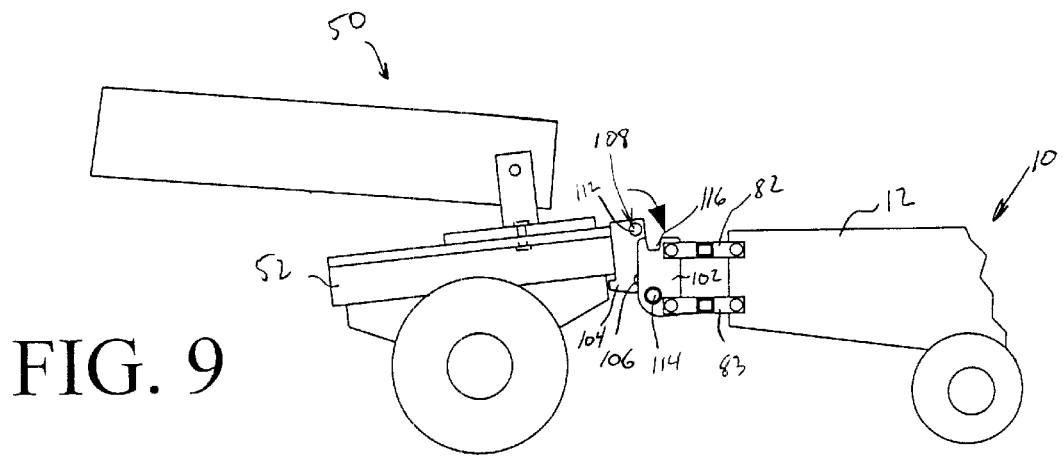
FIGS. 9–11 illustrate the progressive connection of the swing conveyor assembly to the conveying machine utilizing the linkage assembly of FIG. 6.

Each bracket 104 includes a pair of through holes 106 and 108 (See FIG. 9). Each plate 102 has a lower through hole 114 alignable with a respective bracket hole 106 and a slot 116 alignable with a respective bracket hole 108. Removable shaft 110 is received in the through holes 106 and 114 and shaft 112 is received in the through holes 108 and the slots 116. A pin 118 is inserted through each shaft 110 to secure the shaft 110 in the holes 106 and 114 and to prevent lateral shifting. As will be described with reference to FIGS. 8 and 11, each pin 118 also prevents rotation of the plates 102 relative to the shaft 110. A holed securing cap 120 is secured to each plate 102 coaxial with the lower through hole 114. The securing cap 120 is configured to engage a portion of the pin 118 after insertion to prevent rotation of the plate 102 relative to the shaft 110. In the illustrated embodiment, the securing cap 120 includes grooves 122 in which the pin 118 is maintained. Other engaging methods, for example, a rotatable clip on the securing cap 120 or the like, may also be used.

Figure 10:
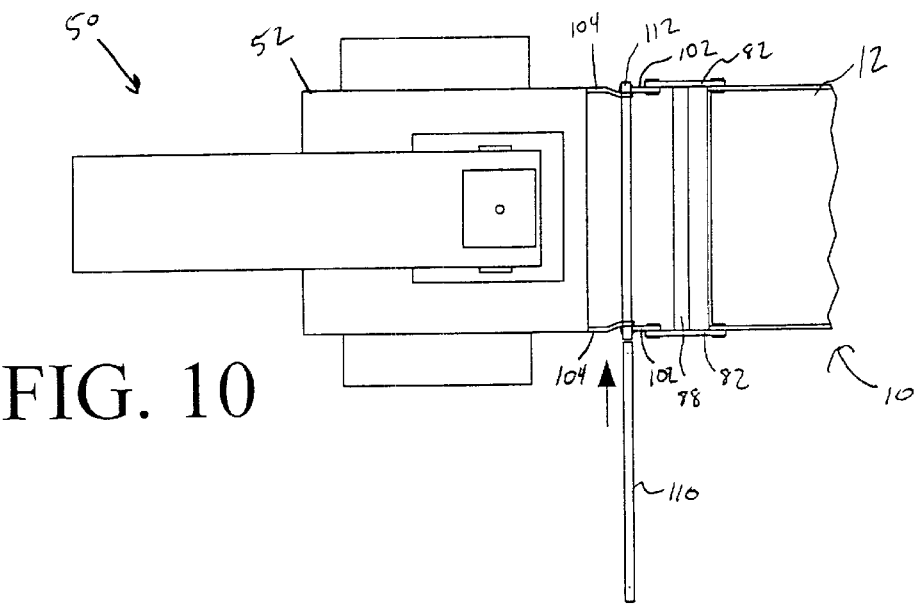
Figure 11:
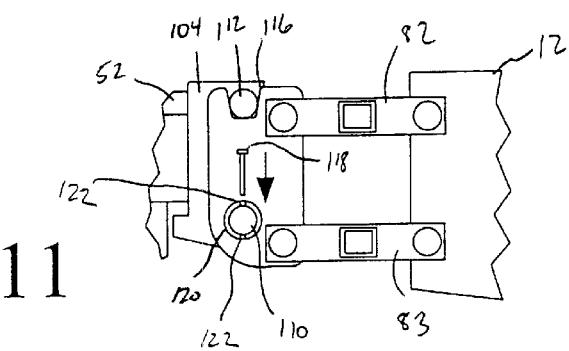

Connection of the swing conveyor assembly 50 to the linkage assembly 100 will be described with reference to FIGS. 9–11. The swing conveyor assembly 50 is positioned relative to the conveying machine 10 such that the shaft 112 extending through bracket holes 108 can be rotated until shaft 112 is received in slots 116. Bracket through holes 106 are aligned with the plate through holes 114 and shaft 110 is inserted through the through holes 106 and 114. A pin 118 is then inserted through the shaft 110 adjacent each plate 102 and engaged by the securing cap 120. The swing conveyor assembly 50 is ready for use. Disconnection of the swing conveyor assembly 50 is accomplished by performing the above steps in the reverse order. It may be desirable to raise the wheel assembly 54 and the linkage assembly 100 as the pins 118 are removed to reduce the force on the pins 118. Slots 116 may also be through holes, whereby shaft 112 may be slideably inserted and removed rather than rotated.

What is claimed is:

1. A swing conveyor assembly for use with a base vehicle including a first material conveyor having a discharge location, the swing conveyor assembly comprising:

a platform supported by a wheel assembly;

a linkage assembly adapted to be interconnected between the platform and the base vehicle, the linkage assembly configured to permit free vertical movement over a given range of the platform and wheel assembly relative to the base vehicle such that the wheel assembly can maintain contact with a surface over which the swing conveyor is traveling; and a second material conveyor having a receiving location, the second material conveyor rotatably connected to the platform about a vertical rotation axis, the rotation axis extending through the receiving location and the discharge location when the platform is connected to the base vehicle such that receiving location remains aligned with the discharge location as the second material conveyor is rotated relative to the first material conveyor.

2. The swing conveyor assembly of claim 1 wherein the linkage assembly includes at least one link bar adapted to be pivotally interconnected between the base vehicle and the platform.

3. The swing conveyor assembly of claim 1 wherein the linkage assembly includes at least one plate connected to the platform and at least one link bar adapted to be pivotally interconnected between the base vehicle and the plate.

4. The swing conveyor assembly of claim 1 wherein the linkage assembly includes:

two plates that are positioned on opposite sides of the platform;

a shaft extending through the platform and each plate to interconnect the plates to the platform;

removable pins extending through the shaft adjacent each plate to removably secure the shaft within the platform and the plates; and at least one link bar pivotally interconnected between each plate and the base vehicle.

5. The swing conveyor assembly of claim 4 wherein each plate includes an open slot for receiving and maintaining a second shaft extending through the platform.

6. The swing conveyor assembly of claim 1 wherein the base vehicle has a first longitudinal axis and the platform has a second longitudinal axis and the linkage assembly maintains the first and second longitudinal axes parallel to one another.

7. The swing conveyor assembly of claim 6 wherein the wheel assembly is steerable.

8. The swing conveyor assembly of claim 1 wherein the second material conveyor is pivotable about a horizontal pivot axis adjacent the receiving location.

9. A linkage assembly for interconnecting a base vehicle having a rear end with opposed sides and a swing conveyor having a forward end with opposed sides, the linkage assembly comprising:

a pair of plates positionable on opposite sides of the swing conveyor forward end, each plate having an outside surface;

a shaft extendable through the swing conveyor forward end and each of the plates to interconnect the plates to the swing conveyor;

a pair of removable pins, each pin extendable through the shaft adjacent a respective plate outside surface to secure the plate against lateral movement;

at least one link bar pivotally interconnected between each plate and the base vehicle rear end such that the plates are able to move vertically over a given range relative to the base vehicle.

10. The linkage assembly of claim 9 wherein each plate includes an open slot for receiving and maintaining a second shaft extending through the swing conveyor forward end.

11. The linkage assembly of claim 9 wherein each pin is configured to secure the respective plate against pivotal movement relative to the shaft.

12. The linkage assembly of claim 9 wherein a pair of parallel link bars is pivotally interconnected between each plate and the base vehicle rear end.

13. A swing conveyor assembly for use with a base vehicle including a first material conveyor having a discharge location, the swing conveyor assembly comprising:

a platform having opposed sides and being supported by a wheel assembly;

a linkage assembly comprising:

a pair of plates positionable on opposite sides of the platform, each plate having an outside surface;

a shaft extendable through the platform and each of the plates to interconnect the plates to the platform;

a pair of removable pins, each pin extendable through the shaft adjacent a respective plate outside surface to secure the plate against lateral movement; and at least one link bar pivotally interconnected between each plate and the base vehicle rear end such that the plates are able to move vertically over a given range relative to the base vehicle; and a second material conveyor rotatably connected to the platform about a vertical rotation axis and configured to receive a discharged material from the first material conveyor.

14. The swing conveyor assembly of claim 13 wherein the base vehicle has a first longitudinal axis and the platform has a second longitudinal axis and the linkage assembly maintains the first and second longitudinal axes parallel to one another.

15. The swing conveyor assembly of claim 13 wherein the wheel assembly is steerable.

16. The swing conveyor assembly of claim 13 wherein the second material conveyor has a receiving location and the rotation axis extends through the receiving location and the discharge location when the platform is connected to the base vehicle such that receiving location remains aligned with the discharge location as the second material conveyor is rotated relative to the first material conveyor.

17. The swing conveyor assembly of claim 13 wherein the second material conveyor has a receiving location and is pivotable about a horizontal pivot axis adjacent the receiving location.

18. The swing conveyor assembly of claim 13 wherein each plate includes an open slot for receiving and maintaining a second shaft extending through the platform.

19. The swing conveyor assembly of claim 13 wherein each pin is configured to secure the respective plate against pivotal movement relative to the shaft.

20. The swing conveyor assembly of claim 13 wherein a pair of parallel link bars is pivotally interconnected between each plate and the base vehicle rear end.

* * * * *